W. A. ALLEN.

SUPPORTING AND RETAINING DEVICE FOR SPARE TIRES.

APPLICATION FILED SEPT. 12, 1908.

Reissued Aug. 6, 1912. 13,454.

WITNESSES

James F. Duhamel,

Aaron Ginsburg

INVENTOR

William A. Allen

BY

Geo. H. Bowersox

ATTORNEY

UNITED STATES PATENT OFFICE.

WILLIAM A. ALLEN, OF NEW YORK, N. Y.

SUPPORTING AND RETAINING DEVICE FOR SPARE TIRES.

13,454. Specification of Reissued Letters Patent. Reissued Aug. 6, 1912.

Original No. 860,891, dated July 23, 1907, Serial No. 340,343. Application for reissue filed September 12, 1908. Serial No. 452,800.

*To all whom it may concern:*

Be it known that I, WILLIAM A. ALLEN, a citizen of the United States, and a resident of New York, borough of Manhattan, in the county and State of New York, have invented certain new and useful Improvements in Supporting and Retaining Devices for Spare Tires, of which the following is a specification.

This invention relates to devices for supporting and retaining spare or extra tires for automobiles.

As is well known, an automobilist generally carries, as a part of the equipment of his machine, one or more extra tires with which he may replace one or more of the tires in use should the same become damaged and useless. Pneumatic tires for automobiles are large, heavy and cumbersome, and it is not an easy matter to properly secure them to some part of the automobile, where they will not be in the way of passengers. One or more of these extra tires may be secured to the body of the vehicle by means of straps, but this has been found to be objectionable inasmuch as such securing means does not prevent rubbing contact of the tires against each other and against the body of the machine, which subjects the tires to unnecessary wear and tends to weaken them.

The present invention contemplates a device having a three-fold function; first, to provide for the locking of one or more tires to prevent theft thereof; second, to provide for the firm and rigid support of each of a plurality of tires and prevent rubbing contact with each other and with the body of the machine; and, third, to provide a capacity of two or more tires and yet as rigidly and satisfactorily secure one tire only, or any number less than the capacity of the device.

My invention will be more readily understood by reference to the accompanying drawings, forming a part of this specification, in which—

Figure 1:
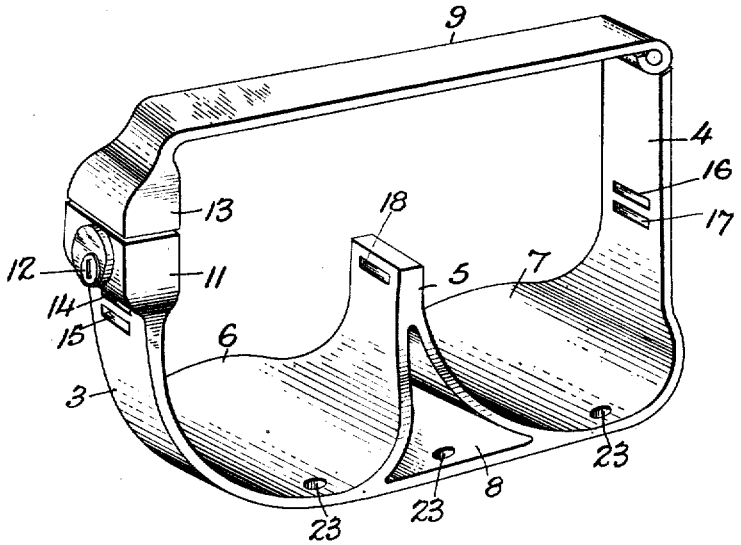
Figure 2:
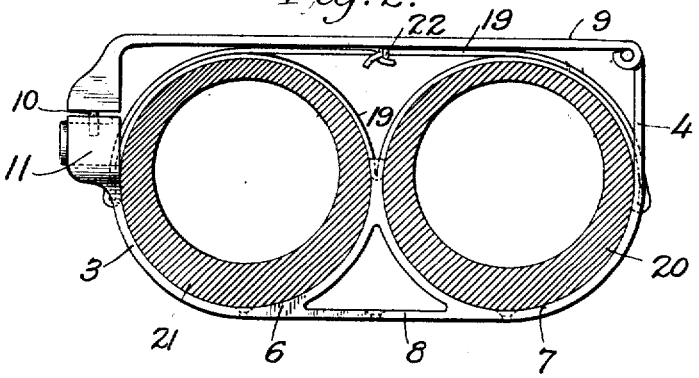

Figure 1 is a perspective view of a device embodying my invention, and Fig. 2 is a side elevation of the same with sectional views of the tires secured therein.

Referring now to the drawings in detail, the preferred form of my invention, as illustrated herein, comprises a substantially double U-shaped casting, having the outside upwardly projecting arms 3 and 4 and the interior dividing arm 5, between which are the curved base portions 6 and 7, each of a size and shape to receive a tire of average size which should fit as snugly as practicable therein. In order to properly brace and give strength to the device, a flat portion 8 is provided connecting the bases of the two U-shaped portions of the frame. At the upper end of the arm 4, is suitably hinged the transverse bar 9, the free end of which is provided with a catch or latch 10 which enters and engages suitable locking mechanism in the enlarged portion 11 provided at the upper end of the arm 3. The arm 9 is designed to be unlocked at will by means of a suitable key inserted in the key-hole 12 and operated in the usual and well-known manner. These tires are generally supported against the side or rear of the machine, and I have shown the arm 4—which is intended to be in contact with some portion of the body of the automobile—longer than the arm 3, and the free end of the bar 9 bent downwardly to meet the upper end of the bar, 3, in order to provide for more ready placing of the tires in the device and their removal therefrom. The arm 3 being shorter, the upper end thereof is not so much in the way when tires are placed in or taken from the device. I have furthermore shown the end of the arm 9 provided with an enlarged portion 13, which corresponds and coincides with the enlarged portion 11 at the top of the arm 3, in order to avoid abrupt shoulders and sharp angles on the closed device, which might be likely to engage and tear the garment of a passenger in getting into or out of the automobile.

The arm 3 is provided with a pair of slots 14 and 15, the arm 4 is provided with a similar pair of slots 16 and 17, and the arm 5 is provided with a slot 18. Inasmuch as automobile tires are of many different sizes, and it is desired to adapt my device to accommodate and snugly secure and retain tires of any one of a number of different sizes, I accomplish this purpose by providing a strap 19, which may be passed through the slots 16 and back through the slot 17, over the top of the tire 20 and through the slot 18, thence over the top of the tire 21 and through the slot 15, thence back through the slot 14 and tied to the other end of said strap, as at 22, or otherwise buckled or suitably secured thereto.

It will now be apparent that with my device suitably secured to the automobile—and I prefer that it should be secured to one of the two running boards thereof by means of screws passed through the holes 23—I may, if I desire, place a single tire within the device, in either of the receptacles therefor, and by drawing the strap 19 tight and securing the ends thereof the tire will be firmly and rigidly held in place and may be locked within the device. If it is desired to carry two extra tires, each is placed in one of the receptacles therefor and the strap similarly drawn tight and secured. In either case, there could be no frictional rubbing between the tires or between a tire and the body of the machine.

While the location of my device with respect to the contained tire or tires, is not material so far as the purposes of this invention are concerned, I prefer, as stated, to secure the same to one of the running boards of the automobile, in which case it is under the tire or tires which must obviously be also laterally supported in some manner at their tops. So far as the present invention is concerned, it is immaterial what form of additional retaining or supporting means is provided.

It will be noted that the provision of the strap 19 enables me to adapt the device to snugly and securely retain one or two of any of a number of different sizes of tires, while the bar 9, when closed and latched, prevents theft of the tire or tires or their withdrawal by unauthorized persons. Attention is further directed to the fact that when my device is secured to the base or running board of the machine and the tires are therein, the screws which secure the device to the machine through the holes 23, are inaccessible, and therefore theft by means of attempt to carry away the retaining device itself as well as the tires, is prevented.

Many modifications of minor details of my improved tire supporting and retaining device will doubtless readily suggest themselves to those skilled in the art to which it appertains, and I therefore do not desire to limit my invention to the specific construction herein shown and described.

I claim as new and desire to secure by Letters Patent:

1. In combination, a locking clasp divided into separate compartments each adapted to retain an automobile tire or the like, the locking means being common to all compartments, and means for securing said clasp to the body of a vehicle.

2. In combination, a locking clasp comprising rigid members adapted to embrace a plurality of vehicle tires, and means for fixedly securing one tire only or more than one tire therein.

3. In combination, a locking clasp comprising rigid members adapted to embrace a plurality of vehicle tires, and means adjustable to various sizes of tires for fixedly retaining one tire only or more than one tire therein.

4. In combination, a locking clasp adapted to embrace a plurality of vehicle tires, means for separating the contained tires from each other, and means adjustable to various sizes of tires for fixedly securing said tires within said clasp, and means for securing said clasp to the body of a vehicle.

5. In combination, a locking clasp having receptacles for a plurality of vehicle tires, means for fixedly securing one tire in one receptacle or a tire in each receptacle, and means for securing said clasp to the body of the vehicle.

6. In combination, a locking clasp adapted to embrace a plurality of vehicle tires, means for separating the contained tires, means adjustable to various sizes of tires for fixedly securing one tire only or more than one tire within said clasp, and means for securing said clasp to the body of the vehicle.

7. In combination a locking clasp adapted to embrace a plurality of vehicle tires, means for separating the contained tires, means adjustable to various sizes of tires for fixedly securing one tire only or more than one tire within said clasp, and means for securing said clasp to the body of the vehicle, each tire when locked in the device preventing access to a portion of said securing means.

In testimony whereof I have hereunto set my hand in the presence of two witnesses.

WILLIAM A. ALLEN.

Witnesses:
FRED H. BOWERSOCK,
P. FRANK SONNEK.

Copies of this patent may be obtained for five cents each, by addressing the "Commissioner of Patents, Washington, D. C."

Disclaimer in Reissue Letters Patent No. 13,454.

DISCLAIMER.

13,454, (Reissue.)— *William A. Allen*, New York, N. Y. SUPPORTING AND RETAINING DEVICE FOR SPARE TIRES. Patent dated August 6, 1912. Disclaimer filed May 13, 1913, by the inventor.

Enters this disclaimer—

"To that part of the claim in said specification which is in the following words, to wit:

"1. In combination, a locking clasp divided into separate compartments each adapted to retain an automobile tire or the like, the locking means being common to all compartments, and means for securing said clasp to the body of the vehicle.

"2. In combination, a locking clasp comprising rigid members adapted to embrace a plurality of vehicle tires, and means for fixedly securing one tire only or more than one tire therein.

"3. In combination, a locking clasp comprising rigid members adapted to embrace a plurality of vehicle tires, and means adjustable to various sizes of tires for fixedly retaining one tire only or more than one tire therein." [*Official Gazette, May 20, 1913.*]